United States Patent [19]

Taneda et al.

[11] Patent Number: 4,578,002
[45] Date of Patent: Mar. 25, 1986

[54] TRANSPORT APPARATUS FOR FLAT ARTICLES

[75] Inventors: Kōzō Taneda, Kodaira; Masae Chiba, Kawasaki; Junichi Naka, Tokyo; Shunichi Watanabe, Machida, all of Japan

[73] Assignee: Snow Brand Milk Products Co., Ltd., Sapporo, Japan

[21] Appl. No.: 619,769

[22] Filed: Jun. 12, 1984

[30] Foreign Application Priority Data

Jun. 22, 1983 [JP] Japan ................. 58-113176

[51] Int. Cl.⁴ .................. B65G 53/40; B65G 51/02
[52] U.S. Cl. ........................ 406/28; 406/83; 406/76
[58] Field of Search ............. 406/10, 28, 110–112, 406/83–84, 176, 180, 8, 19, 21, 26, 31, 76

[56] References Cited

U.S. PATENT DOCUMENTS

| 1,303,604 | 5/1919 | Sims | 406/176 |
| 3,099,497 | 7/1963 | Albert | 406/128 X |
| 4,135,684 | 1/1979 | Willey | 406/28 X |
| 4,157,796 | 6/1979 | Warmann | 406/31 |
| 4,178,662 | 12/1979 | Borodin | 406/84 |
| 4,325,660 | 4/1982 | Jones | 406/84 |

FOREIGN PATENT DOCUMENTS

| 1104436 | 4/1961 | Fed. Rep. of Germany | 406/83 |
| 186305 | 11/1963 | Sweden | 406/176 |

Primary Examiner—Jeffrey V. Nase
Assistant Examiner—L. E. Williams
Attorney, Agent, or Firm—Flynn, Thiel, Boutell & Tanis

[57] ABSTRACT

A transport apparatus in which a block of a plurality of flat articles, aligned uprightly and juxtaposed laterally, is transported by air flow through a transport pipeline, which comprises the pipeline, which is inclined upwards in a direction of transport at a loading station of the pipeline and stands uprightly to terminate in a downward opening at an unloading station, a push member, which is movable in the longitudinal direction of the pipeline and has an air pipe, is provided at a rear end of the pipeline, and a band, which is provided near the downward opening and actuated by an air supply means to project toward the center of the downward opening.

6 Claims, 4 Drawing Figures

TRANSPORT APPARATUS FOR FLAT ARTICLES

BACKGROUND OF THE INVENTION

This invention relates to a transport apparatus of the type in which a block of a plurality of flat articles, aligned uprightly and juxtaposed laterally, is transported by air flow through a transport pipeline.

Conventionally, this type of transport apparatus has already been known wherein articles are transported by air flow through a pipeline. Advantageous convenience of the transport apparatus has been highly evaluated because articles can be tranported from a stockroom to a utilization place in a workshop, without disturbing the outer workings and requiring any surplus space.

The conventional transport apparatus utilizing the air flow, however, fails to transport flat, thin articles such as a vessel for storage of various goods and a cover or lid of the vessel. In general, these flat articles are accommodated in a container for their storage in the stockroom. Typically, when accommodating these flat articles in the container, a number of flat articles are respectively aligned uprightly and juxtaposed laterally to form an elongated block of the flat articles. A plurality of such blocks, each extending laterally, are loaded into the container in row and column pattern. However, if the thus loaded block is directly taken out of the container so as to be set into a loading station of the transport pipeline, the respective flat articles cannot stand by themselves but fall down, and the block collapses. A similar phenomenon occurs at an unloading station. Therefore, the conventional transport apparatus cannot transport the flat articles.

For these reasons, it has been the practice to transport the container per se accommodating the flat articles from the stockroom to the utilization place, resulting in disadvantages that the other workings are disturbed and a surplus space is required for storage and transport of the container.

SUMMARY OF THE INVENTION

A principal object of the present invention is to provide a transport apparatus which can eliminate the above disadvantages of the conventional transport apparatus and which can load a block of a plurality of flat articles, aligned uprightly and juxtaposed laterally in a container, into a pipeline and unload the block from the pipeline, without causing the block to collapse.

According to this invention, the above object can be accomplished by a transport apparatus comprising a transport pipeline which is inclined upwards in a direction of transport at a loading station of the pipeline and stands uprightly to terminate in a downward opening at an unloading station, a push means provided at a rear end of the pipeline, the push means being movable in the longitudinal direction of the pipeline and having an air pipe, an annular resilient band provided near the downward opening, and an air supply means for projecting the resilient band toward the center of the downward opening. If the respective flat articles are irregularly loaded into the transport pipeline at the loading station, the upwardly inclined pipeline prevents the flat articles from falling down in the forward direction and the push member abuts against the flat articles to prevent them from falling down in the backward direction, thereby preventing the block of the flat articles from collaspsing. At the unloading station, the object to be transported is not discharged from the pipeline unlimitedly but is temporarily held by the resilient band projecting toward the center of the downward opening and subsequently discharged, thereby preventing the block from collapsing upon unloading.

Another object of this invention is to provide a transport apparatus which can automatically achieve the temporary stopping of the object to be transported at the unloading station of the pipeline, without requiring a special manual operation by the operator.

This object can be accomplished by an embodiment of the present invention wherein a sensor for detecting dropping of the articles to be transported is provided above the resilient band and near the downward opening, and the sensor controls the air supply means. When the sensor detects the article, the air supply means is so controlled as to feed air to the back of the resilient band and pressure of the thus fed air causes the resilient band to project toward the center of the downward opening. The swollen surface of the resilient band captures and holds the descending article. Typically, the controlling is effected by transferring a change-over valve.

DETAILED DESCRIPTION OF THE INVENTION

Figure 1:
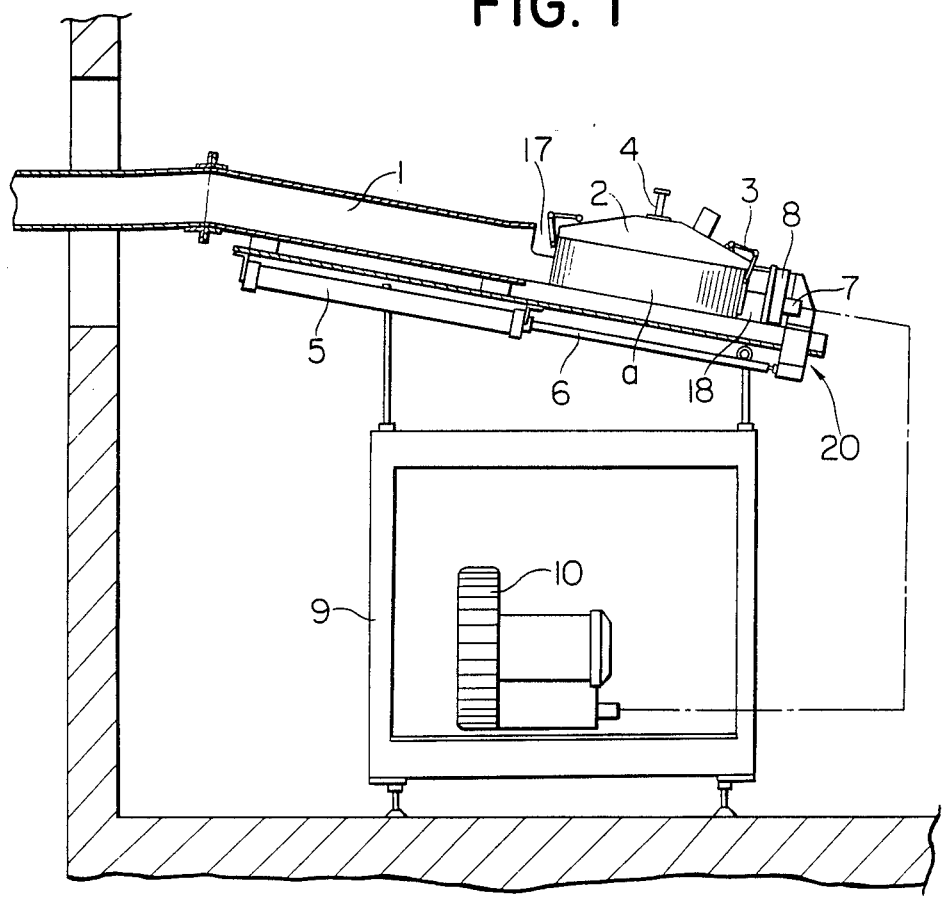
FIG. 1 is a longitudinally sectioned front view showing a loading station of a transport apparatus according to this invention.
Figure 2:
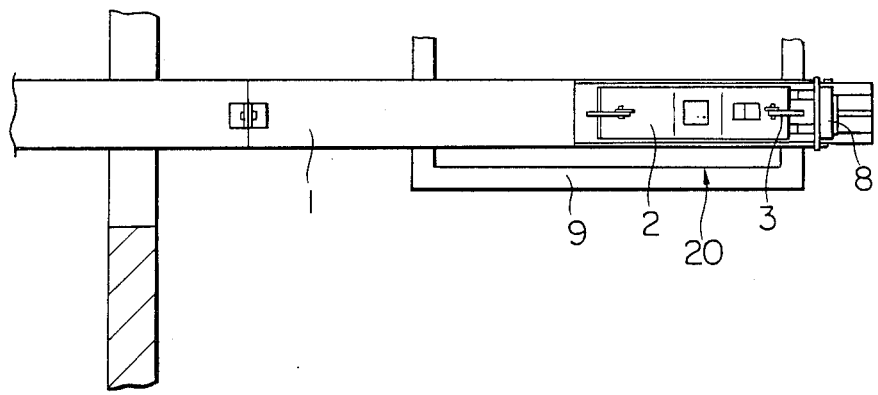
FIG. 2 is a plan view of the FIG. 1 embodiment.
Figure 3:
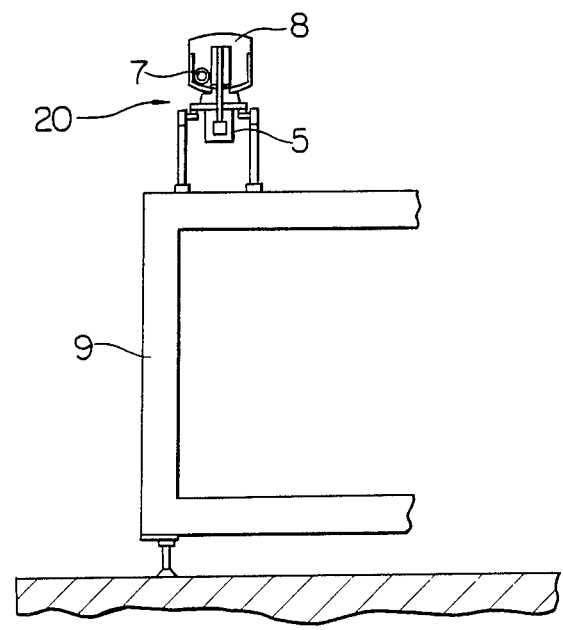
FIG. 3 is a right side view showing a portion of the FIG. 1 embodiment.

Referring now to FIGS. 1 to 3, there is illustrated a loading station of a transport apparatus utilizing pressurized air flow. At the loading station, generally designated by reference numeral 20, a transport pipeline 1 is inclined upwards in a direction of transport and has a rear end opening 18 contiguous to a loading opening 17 formed in its top surface near the rear end.

A suction head 2 is brought to the loading station 20 by a drive means such as a robot (not shown) disposed near the pipeline 1. The suction head 2 has a length which is substantially equal to that of a block of flat articles. Swingably mounted on longitudinally opposite end walls of the suction head 2 are holding arms 3 which are swung by a drive means (not shown) provided on the suction head 2 to open or close their tips. The suction head 2 has a flat bottom surface formed with a plurality of suction holes (not shown) and a top surface connected with a suction pipe 4.

Mounted to the bottom of the pipeline 1 is a cylinder 5 which is directed toward the rear end of the pipeline. A piston rod 6 of the cylinder 5 is mounted, at its tip, with a push plate 8 which is inserted into the opening 18. The push plate 8 is connected with an air pipe 7 which in turn is connected to a blower 10 installed on a frame 9.

Figure 4:
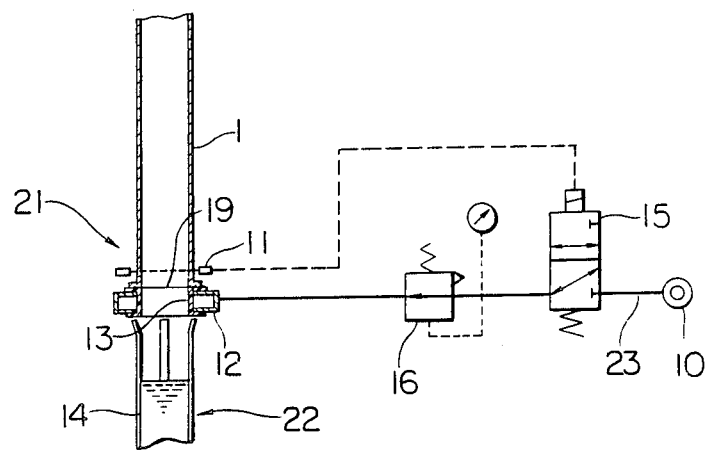
FIG. 4 is a longitudinally sectioned front view showing an unloading station of the transport apparatus according to this invention.

FIG. 4 shows an unloading station 21. At the unloading station, the pipeline 1 stand substantially uprightly, terminating in a downward unloading opening 19. Near and above the unloading opening 19 is provided a sensor 11. Beneath the unloading opening 19 is provided an annular chamber 12 which has an inner circumferential opening over which an annular resilient band 13 is applied. Disposed beneath the chamber 12 is a guide means 22 having a space surrounded by a plurality of guide bars 14.

The chamber 12 is connected to the blower 10 via a pipe 23 in which a change-over valve 15 and a check valve 16 intervene.

In operation, the holding arms 3 press and hold the opposite side ends of the block a and the suction head 2 evacuated through the suction pipe 4 adsorbs the block a, in order to bring the block a to a location as shown in FIG. 1, that is, to the loading station. At the loading station, the holding by the holding arms and adsorption by the suction head 2 are deactivated to release the block a and thereafter, the suction head 2 is retracted from the opening 17.

The cylinder 5 is then operated to cause the push plate 8 to push the block a into the pipeline 1 and at the same time, pressurized air is supplied from the blower via the pipe 7 so as to move the block a through the pipeline 1. In this procedure, the block a of the flat bodies will not collapse in the forward direction when the suction head 2 releases the block a at the loading station 20 as described above since the pipeline 1 is inclined upwards in the transport direction. The block a will not also collapse in the backward direction since the push plate 8 abuts against the rear side of the block a.

When the thus transported block a reaches the unloading station 21, the sensor 11 detects the passage of the block a to energize the change-over valve 15 which in turn permits the supply of the pressurized air to the resilient band 13. Consequently, the resilient band 13 projects or swells toward its center and a lower end portion of the descending block a is held by the swollen band surface to stop the block a.

At the loading station 20, the cylinder 5 is subsequently operated in the opposite direction to return the push plate 8 to the original position shown in FIG. 1.

Thereafter, when another sensor (not shown) provided for the guide means 22 detects that a predetermined space corresponding to the absence of the preceding block a is established within the guide means 22, a detection signal energizes the change-over valve 15 to transfer the same, for communicating the interior of the chamber 12 with atmosphere. As a result, the band 13 recovers or retracts to allow the block a to drop into the guide means 22.

The above operations are repeated to ensure constant feeding of the necessary flat bodies to the guide means 22.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In a transport apparatus in which articles to be transported are inserted in a transport pipeline and the articles are transported under the application of air flow through the pipeline, the improvement which comprises; a transport pipeline which is inclined upwards in the direction of transport at a loading station of said transport pipeline and stands uprightly to terminate in a downwardly directed opening at an unloading station, push means provided at said loading station of said pipeline, said push means comprising a cylinder having a piston rod, movable therein, a push plate coupled to said piston rod and an air pipe mounted on said push plate, said push plate being movable in the longitudinal direction of said pipeline and adapted to push said articles into said pipeline while pressurized air is fed through said air pipe to move said articles through said pipeline and, an annular resilient band provided near said downward opening, and an air supply means for projecting said resilient band toward the center of said downward opening.

2. A transport apparatus according to claim 1 wherein a sensor for detecting dropping of the article to be transported is provided above said resilient band, and said sensor controls said air supply means.

3. A transport apparatus as set forth in claim 1 wherein said apparatus is adapted to transport a plurality of flat articles aligned uprightly and laterally to the direction of transport in a block-like form.

4. A transport apparatus as set forth in claim 3, wherein said annular resilient band is projected toward the center of said downward opening to hold descending articles in block-like form prior to discharge from said unloading station.

5. A transport apparatus for transporting a pack of a plurality of upright flat articles which are stacked in horizontal alignment through a pipeline so that the pack does not become broken up during such transporting, which comprises:

a pipeline having a loading station at one end thereof and an unloading station at the other end thereof, said loading station having a loading opening that opens upwardly and communicates with the adjacent first portion of said pipeline, said adjacent first portion of said pipeline being inclined upwardly in a direction away from said loading station, said unloading station communicating with the adjacent second portion of said pipeline, said adjacent second portion of said pipeline extending downwardly, said unloading station having an annular inflatable resilient band which, when inflated, projects into the path of travel of the pack into said unloading station to engage and hold the pack, and means for inflating said band;

a suction head movable into said loading opening for inserting the pack of flat articles into said pipeline at said loading station, said suction head comprising a pair of spaced-apart releasable clamp arms for engaging the opposite ends of the pack and clamping the pack therebetween and a flat bottom surface extending between said clamp arms and having a plurality of suction holes therethrough for applying suction to the pack;

a push plate movably disposed in said pipeline and movable from a first position in which it is located at the outer end of said loading station to a second position in which it is located in said adjacent first portion of said pipeline, said push plate being adapted to move the pack into said adjacent first portion of said pipeline, said push plate having an air pipe connected thereto and opening toward said pipeline, means for supplying air to said air pipe for transporting the pack through said pipeline so that when said push plate is in said second position air is supplied through said air pipe to move the pack from said loading station to said unloading station; and a fluid operated piston and cylinder connected to said push plate for moving same between said first and second positions.

6. A transport apparatus for transporting a pack of a plurality of upright flat articles which are stacked in horizontal alignment through a pipeline so that the pack does not become broken up during such transporting, which comprises:

a pipeline having a loading station at one end thereof and an unloading station at the other end thereof, said loading station having a loading opening that communicates with the adjacent first portion of said pipeline, said adjacent first portion of said pipeline being inclined upwardly in a direction away from said loading station, said unloading station communicating with the adjacent second portion of said pipeline, said adjacent second portion of said pipeline extending downwardly, said unloading station having an inflatable stopping structure which, when inflated, projects into the path of travel of the pack into said unloading station to engage and hold the pack, and means for inflating said stopping structure;

a push plate movably disposed in said pipeline and movable from a first position in which it is located at the outer end of said loading station to a second position in which it is located in said adjacent first portion of said pipeline, said push plate being adapted to move the pack into said adjacent first portion of said pipeline, said push plate having an air pipe connected thereto and opening toward said pipeline, means for supplying air to said air pipe for transporting the pack through said pipeline so that when said push plate is in said second position air is supplied through said air pipe to move the pack from said loading station to said unloading station; and a fluid operated piston and cylinder connected to said push plate for moving same between said first and second positions.

* * * * *